United States Patent
Ohmachi et al.

[11] Patent Number: 5,348,243
[45] Date of Patent: Sep. 20, 1994

[54] TAPE CARTRIDGE WITH CORNER CASE NOTCH TO PREVENT INADVERTENT WRITING OF DATA ON TAPE

[75] Inventors: Junya Ohmachi; Kengo Saitou; Kazuo Sasaki, all of Miyagi, Japan

[73] Assignee: Sony Corporation, Japan

[21] Appl. No.: 18,569

[22] Filed: Feb. 17, 1993

[30] Foreign Application Priority Data

Feb. 24, 1992 [JP] Japan .................................. 4-035494

[51] Int. Cl.⁵ .......................................... G11B 23/087
[52] U.S. Cl. .................................... 242/342; 242/347; 360/60
[58] Field of Search ....................... 242/192, 197, 199; 360/132, 60

[56] References Cited

U.S. PATENT DOCUMENTS

| | | | |
|---|---|---|---|
| 3,692,255 | 9/1972 | Von Behren | 242/192 |
| 3,976,262 | 8/1976 | Kennedy | 242/192 |
| 4,642,721 | 2/1987 | Georgens et al. | 242/192 |

*Primary Examiner*—Daniel P. Stodola
*Assistant Examiner*—John Q. Nguyen
*Attorney, Agent, or Firm*—Ronald P. Kananen

[57] ABSTRACT

A tape cartridge having a housing structure. The housing structure includes a base plate and a cover having an open-ended box shape and secured to the base plate. The cover includes a top wall, a front wall and a side wall which extend substantially perpendicular to each other to define a corner portion of the cover. A notch is formed at the corner portion of the cover to be thereby prevented from failing to be detected.

3 Claims, 3 Drawing Sheets

TAPE CARTRIDGE WITH CORNER CASE NOTCH TO PREVENT INADVERTENT WRITING OF DATA ON TAPE

BACKGROUND OF THE INVENTION

The present invention relates to a tape cartridge, and more particularly to a tape cartridge having an improved housing structure which is capable of preventing inadvertent writing on a magnetic recording tape on which data is stored.

Two-reel tape cartridges in which a magnetic recording tape wound on two tape reels is driven by a flexible elastic belt, are well known. One example of such tape cartridges is disclosed in U.S. Pat. No. 3,692,255 assigned to Minnesota Mining and Manufacturing Company.

U.S. Pat. No. 3,976,262 discloses a tape cartridge having a write enable plug which is disposed on a cartridge housing shiftably between two positions in which writings on a magnetic recording tape are permitted and prevented, respectively. Minnesota Mining and Manufacturing Company has been proposed a mini tape cartridge having an approximate half size of the prior art tape cartridges. The tape cartridge is discussed with reference to FIGS. 4 and 5 of the present application. The tape cartridge 100 includes a cartridge housing having a base plate 104 and a cover 110 secured to the base plate 104. The cover has a right-front corner portion as viewed in FIGS. 4 and 5, at which a top wall 112, a front wall and a side wall encounter with each other. A write enable plug 120 is provided on the top wall 112 adjacent the right-front corner and formed with a detection tab 122 projecting into a groove which is formed on an upper edge of the front wall. The detection tab 122 act as a detection section which is detectable by a sensing member on a tape drive (not shown). When the detection tab 122 is placed in its right-most position as seen in FIG. 5 by shifting the plug 120 in a direction as indicated by an arrow "A" of FIG. 5, writing on a magnetic recording tape is permitted. On the other hand, when the detection tab 122 is in its left-most position by shifting the plug 120 in a direction as indicated by an arrow "B" of FIG. 5, writing on the magnetic recording tape is prevented.

In order to prevent renewal or deletion of data stored on the magnetic recording tape due to inadvertent operation of the shiftable plug, a tape cartridge replaces the shiftable plug with a notch formed on a given plane surface of the cartridge housing, whereby the tape cartridge is employed as read-only one.

In a case where renewal or deletion of the data stored on such a read-only tape cartridge is carried out, the notch on the cartridge housing is covered with a masking material sheet such as an adhesive tape so that writing for the data renewal is allowed. Owing to the formation of the notch on the plane surface of the cartridge housing, the covering operation by using the masking material sheet is readily performed. In such a condition, the stored data tends to be undesirably renewed or deleted due to failing to remove the masking material sheet from the notch on the cartridge housing.

There is a demand to provide a tape cartridge having an improved housing structure which is capable of preventing inadvertent writing on a magnetic recording tape.

SUMMARY OF THE INVENTION

An object of tile present invention is to provide a tape cartridge having an improved housing structure which is capable of preventing inadvertent writing on a magnetic recording tape on which data is stored.

According to the present invention, there is provided a tape cartridge including a housing accommodating therein two rotatable tape reels, a magnetic recording tape wound on the tape reels, a plurality of tape guides, an endless drive belt, a belt driving roller on which the drive belt is wrapped to be driven, and a plurality of belt guide rollers over which the drive belt is wrapped, the housing comprising:

a base plate;

a cover secured to the base plate, the cover having an open-ended box shape and including three plane walls which extend substantially perpendicular to each other to define a corner portion of the cover; and means for preventing inadvertent writing on the magnetic recording tape, the preventing means being provided at the corner portion of the cover.

DESCRIPTION OF THE PREFERRED EMBODIMENT

Figure 1:
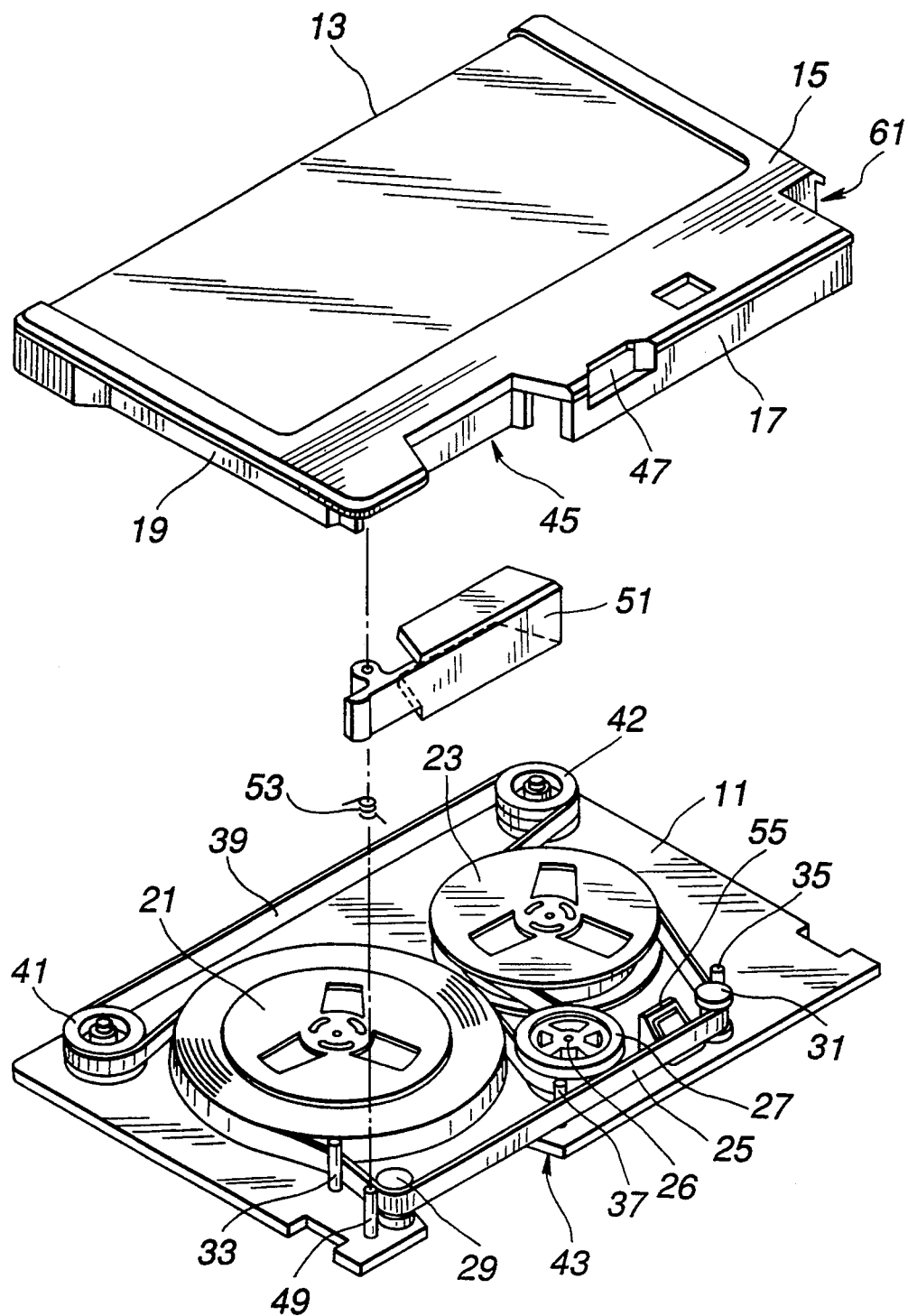
FIG. 1 is an exploded perspective view of a first embodiment of a tape cartridge according to the present invention.

Referring now to FIG. 1, there is shown preferred embodiment of a tape cartridge according to the present invention. As shown in FIG. 1, the tape cartridge includes a rectangular housing having a base plate 11 and a cover 13 secured to the base plate 11. The cover 13 has a top wall 15, a front wall 17 and left and right side walls 19, and a rear wall (not shown). The base plate 11 and the cover 13 cooperate with each other to form a unitary box-like housing. A pair of tape reels 21 and 23 are rotatably mounted on the base plate 11 about axes of rotation, respectively. A tape web 25 is attached at opposite ends thereof to the tape reels 21 and 23 to be wound thereon. A driven roller 27 is disposed rotatably on an axis 26 fixedly mounted adjacent a front edge of the base plate 11. A pair of guide posts 29 and 31 are secured on a front end portion of the base plate 11 and formed integrally with upper and lower flanges, respectively. The flanges serve for limiting a vertical displacement of the tape web 25 to be guided thereon. A pair of guide pins 33 and 35 are fixedly disposed on the base plate 11 between the tape reel 21 and the guide post 29 and between the tape reel 23 and the guide post 31, respectively. A guide pin 37 is Fixedly disposed on the base plate 11 between the guide posts 29 and 31 and adjacent the driven roller 27. The tape web 25 derived from the tape reel 21 in turn passes over the guide pin 33, the guide post 29, the guide pin 37, the driven roller 27, the guide post 31 and the guide pin 35 and leads to the tape reel 23.

An endless drive belt 39 is wrapped over the driven roller 25 and a pair of belt guide rollers 41 and 42 which are rotatably disposed on rear corner portions of the base plate 11. The drive belt 33 engages respective peripheries of the tape web 25 wound on the tape reels 21 and 23 to thereby form two arcuate portions as seen in FIG. 1.

The tape web 25 is exposed through a notch 43 formed at the front edge of the base plate 11 and passes through an aperture 45 formed over the top and front walls 15 and 17 of the cover 13. A magnetic head (not shown) in a tape drive (not shown) is introduced into the notch 43 and the aperture 45 upon insertion of the tape cartridge into the tape drive. The aperture 45 is covered with a lid 51 pivoted by a torsion coil spring 53 about a pivot pin 49 which is secured at the left-front end portion of the base plate 11 as shown in FIG. 1. Formed adjacent the aperture 45 is an opening 47 through which a portion of the driven roller 27 is exposed to the outside of the housing of the tape cartridge. The driven roller 27 is engaged with a drive roller (not shown) in the tape drive through the opening 47 and rotatable driven thereby. Numeral 55 indicates a tape end detection reflector for detection of an end of the magnetic recording tape.

Figure 2:
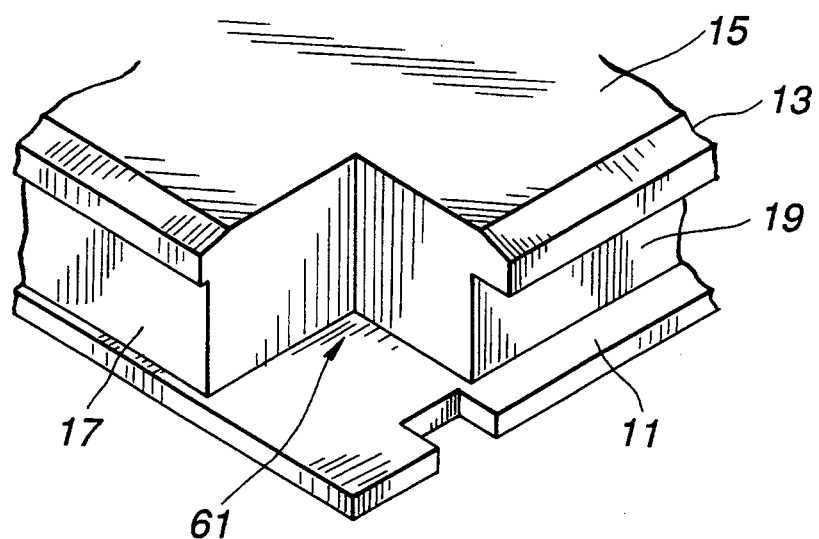
FIG. 2 is an enlarged perspective view of the tape cartridge, showing a write preventing section formed on a cover of the tape cartridge.

As shown in FIG. 2, the cover 13 has a notch which is formed at its right-front corner where the to wall 15, the front wall 17 and the right side wall meet and extends downwardly from the corner up to the base plate 11. The notch 61 serves as write preventing section of the tape cartridge which prevents inadvertent writing or deletion of data store on the magnetic recording tape. The provision of the notch 61 at the corner prevents a failure to detect the existence of the write preventing section even though notch 61 is fully covered with such a masking material sheet as an adhesive tape.

Figure 3:
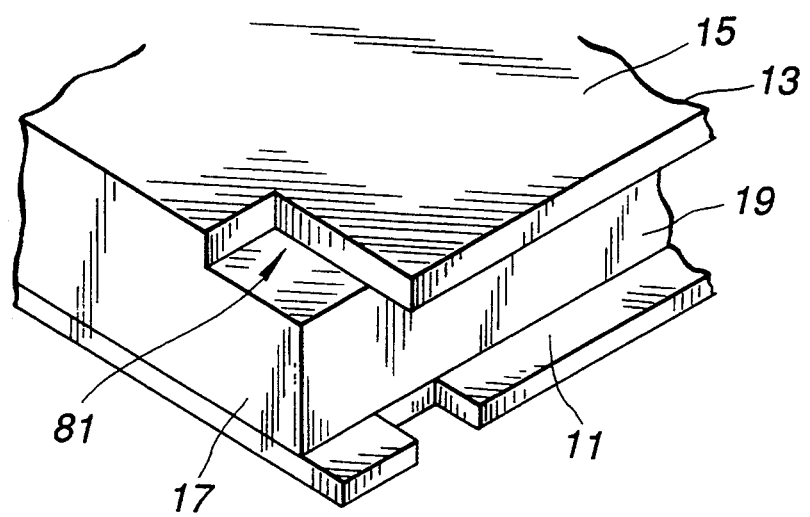
FIG. 3 is an enlarged perspective view of a second embodiment of the write preventing section.
Figure 4:
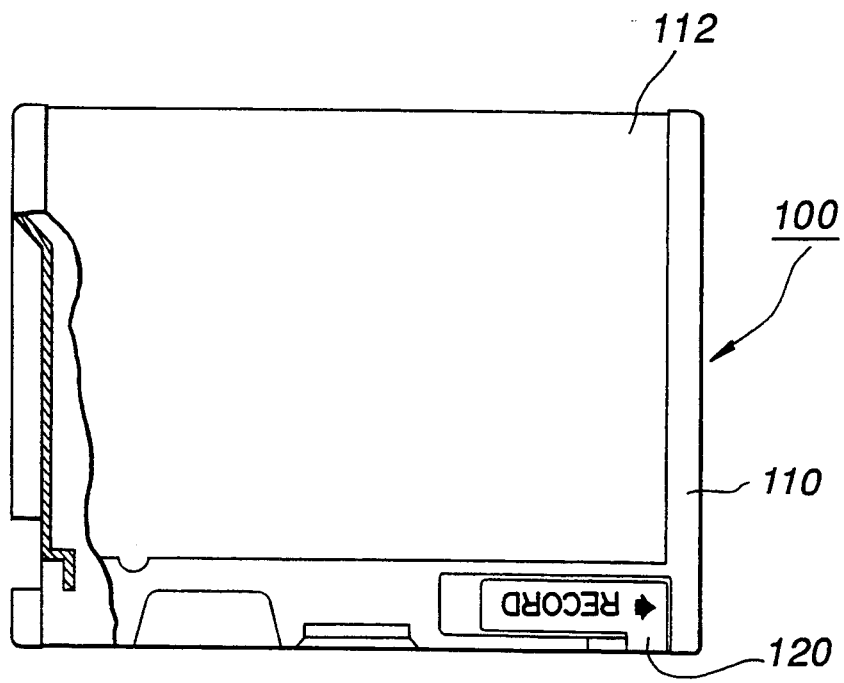
FIG. 4 is a plan view of a prior art tape cartridge.
Figure 5:
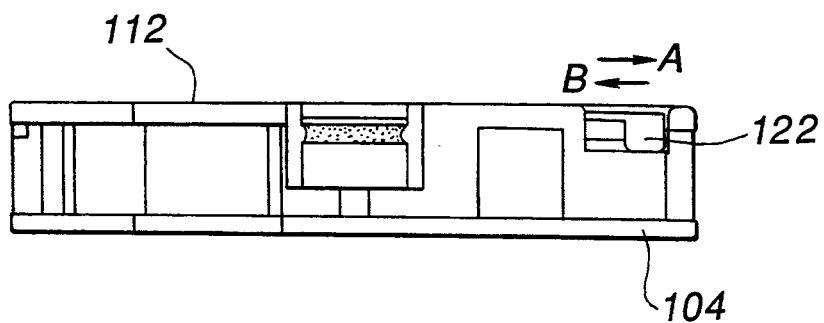
FIG. 5 is a front view of the tape cartridge as shown in FIG. 4.

Referring to FIG. 3, there is shown a second embodiment of the tape cartridge according to the present invention, in which like numerals indicate like parts the first embodiment described above and therefore detailed explanation is omitted.

As shown in FIG. 3, the cover 13 has a notch formed at its right-front corner where the top, front and right side walls 15, 17 and 19 meet. The notch 81 extends downwardly as viewed in FIG. 3, from an upper face of the top wall 15 by a distance equivalent to a depth of the top wall 15.

What is claimed is:

1. A tape cartridge including a housing accommodating therein two rotatable tape reels, a magnetic recording tape wound on the tape reels, a plurality of tape guides, an endless drive belt engaging the tape, a belt driving roller around which the drive belt is wrapped, said housing comprising:

a base plate;

a cover secured to said base plate, said cover having an open-ended box shape and including therein first, second and third plane walls which extend substantially perpendicular to each other to define a corner portion of said cover; and means for preventing inadvertent writing on the magnetic recording tape by a tape recording/reproducing apparatus comprising a notch defined at the corner portion of said cover by:

a first wall portion which is mutually perpendicular to said first and second plane walls, and a second wall portion which is mutually perpendicular to said first and third plane walls, said second wall portion intersecting said first wall portion at a predetermined angle to form a corner line of said notch which is normal to said first plane wall and parallel with said second and third plane walls.

2. A tape cartridge as claimed in claim 1, wherein said magnetic recording tape is adapted for exclusive use for reproducing data stored thereon.

3. A tape cartridge including a housing accommodating therein two rotatable tape reels on which a magnetic recording tape is wound and which are driven by an endless drive belt, comprising:

a box-shaped cover secured to a base plate, said box-shaped cover including a top plane wall and first and second side walls which extend substantially perpendicular to each other and which meet to define a corner portion of said cover; and means for preventing inadvertent writing on the magnetic recording tape by a tape recording/reproducing apparatus, comprising a constantly exposed notch which removes a portion of each of said top wall and said first and second walls respectively, and which is so configured as to prevent ready masking.

* * * * *